(12) United States Patent
Selgert et al.

(10) Patent No.: US 8,818,362 B2
(45) Date of Patent: Aug. 26, 2014

(54) METHOD OF DETERMINING A LOCATION OF A MOBILE DEVICE AND METHOD OF MANAGING A LIST FOR USE IN SUCH A METHOD

(75) Inventors: Franklin Selgert, Berkel en Rodenrijs (NL); Antonius Hendrikus Johannes Norp, The Hague (NL)

(73) Assignees: Koninklijke KPN N.V., The Hague (NL); Nederlandse organisatie voor Toegepast-Natuurwetenschappelijk Onderzoek TNO, Delft (NL)

( * ) Notice: Subject to any disclaimer, the term of this patent is extended or adjusted under 35 U.S.C. 154(b) by 586 days.

(21) Appl. No.: 12/640,261

(22) Filed: Dec. 17, 2009

(65) Prior Publication Data

US 2010/0159885 A1 Jun. 24, 2010

(30) Foreign Application Priority Data

Dec. 19, 2008 (EP) .................................... 08022092

(51) Int. Cl.
*H04W 4/00* (2009.01)
(52) U.S. Cl.
USPC ..................... 455/434; 455/435.2; 455/456.1; 370/328; 370/338
(58) Field of Classification Search
USPC .......................... 455/414.1, 456.1–457, 434, 455/67.11–67.16, 423–425, 561, 552.1, 455/404.1–404.2; 370/331–338
See application file for complete search history.

(56) References Cited

U.S. PATENT DOCUMENTS

| | | | |
|---|---|---|---|
| 6,968,194 B2 | 11/2005 | Aljadeff et al. | |
| 7,116,988 B2 * | 10/2006 | Dietrich et al. | 455/456.1 |
| 7,123,910 B2 * | 10/2006 | Lucidarme et al. | 455/434 |
| 7,433,673 B1 | 10/2008 | Everson et al. | |
| 8,014,804 B2 * | 9/2011 | Banerjea | 455/513 |
| 8,032,133 B2 * | 10/2011 | Niemela et al. | 455/426.1 |

(Continued)

FOREIGN PATENT DOCUMENTS

| | | |
|---|---|---|
| EP | 1545146 | 6/2005 |
| EP | 1802154 | 6/2007 |

(Continued)

OTHER PUBLICATIONS

EP Search Report, European Patent Application 08022092.4 dated Jul. 27, 2009.

(Continued)

*Primary Examiner* — Sharad Rampuria
(74) *Attorney, Agent, or Firm* — McDonnell Boehnen Hulbert & Berghoff LLP (57) ABSTRACT

The invention relates to a method of determining a location of a mobile device for use in a first communication network and a second communication network. The mobile device is camped on a cellular base station in the second communication network. According to the method, a list of records of communication units within the first and/or second communication network that are located within a predetermined geographical area is obtained. A communication unit record contains information representative of the identity of the respective communication unit, information representative of a position of the respective communication unit, and a reliability indication of the respective communication unit. Additionally, with the mobile device, communication units within the first and second communication network are detected. Finally, the location of the mobile device is detected based on the information representative of the position, the reliability indication, and an accuracy indication of the detected communication units.

20 Claims, 5 Drawing Sheets

(56) References Cited

U.S. PATENT DOCUMENTS

| | | | |
|---|---|---|---|
| 8,045,982 B2 * | 10/2011 | Khoo et al. | 455/434 |
| 8,244,241 B2 * | 8/2012 | Montemurro | 455/434 |
| 8,611,897 B2 * | 12/2013 | Pudhey et al. | 455/434 |
| 8,644,793 B2 * | 2/2014 | Selgert et al. | 455/404.2 |
| 8,665,847 B2 * | 3/2014 | Holostov et al. | 370/338 |
| 8,682,368 B2 * | 3/2014 | Marinier et al. | 455/502 |
| 2002/0168989 A1 * | 11/2002 | Dooley et al. | 455/456 |
| 2003/0218570 A1 * | 11/2003 | Moore et al. | 342/465 |
| 2004/0014474 A1 | 1/2004 | Kanada | |
| 2005/0148368 A1 * | 7/2005 | Scheinert et al. | 455/561 |
| 2005/0208952 A1 * | 9/2005 | Dietrich et al. | 455/456.1 |
| 2007/0207815 A1 * | 9/2007 | Alfano et al. | 455/456.1 |
| 2009/0189810 A1 * | 7/2009 | Murray | 342/357.14 |
| 2009/0221287 A1 * | 9/2009 | Balasubramanian et al. | 455/434 |
| 2013/0183983 A1 * | 7/2013 | Awad et al. | 455/438 |
| 2014/0045505 A1 * | 2/2014 | Henry et al. | 455/444 |

FOREIGN PATENT DOCUMENTS

| | | |
|---|---|---|
| WO | WO 02/082850 | 10/2002 |
| WO | WO 2004/008171 | 1/2004 |
| WO | WO 2004/064327 | 7/2004 |
| WO | WO 2004/077753 | 9/2004 |
| WO | WO 2005/050965 | 6/2005 |

OTHER PUBLICATIONS

EP Search Report, European Patent Application 08022077.5 dated Jun. 30, 2009.

EP Search Report, European Patent Application 08021968.6 dated Jun. 3, 2009.

* cited by examiner

METHOD OF DETERMINING A LOCATION OF A MOBILE DEVICE AND METHOD OF MANAGING A LIST FOR USE IN SUCH A METHOD

CROSS-REFERENCE TO RELATED APPLICATIONS

The present application claims priority to European Patent Application EP 08022092.4 filed in the EPO Patent Office on Dec. 19, 2008, the entire contents of which are incorporated herein by reference.

FIELD OF THE INVENTION

The invention relates to a method of determining a location of a mobile device. Additionally, the invention relates to a mobile device using such a method. Furthermore, the invention relates to a method of managing a list of records of cells located within a predetermined geographical area. Finally, the invention relates to a cellular base station using such a method.

BACKGROUND

Nowadays, the use of mobile devices, e.g. personal digital assistants, portable computers and mobile phones, for wireless communication purposes is widespread. Furthermore, new applications for these devices emerge rapidly. In many of these new applications, services are provided which relate to functionality to the end user of the mobile device based on its location, so called Location Based Services (LBS). Services include, for example, providing navigational support, providing a local weather forecast, or searching for a nearby restaurant.

Depending on the type of service to be provided, different methods of determining the location of the mobile device can be applied. Some services require very accurate locations, while others only need to know the location in a more general fashion.

Well-known methods of determining the location of a mobile device are based on the location of a base station of the radio cell the mobile device is camped on. In these methods, localization may, for example, be based on cellular base station identifiers sent by cellular base stations in the network. If the mobile device knows the geographic location of the base stations corresponding to the base station identifiers, it can determine its position. The determination may be done by assuming that the position of the mobile device coincides with the closest base station, by calculating the position by using a triangulation technique based on positions of surrounding base stations, or by using other techniques known to a person skilled in the art.

Because the coverage area of a cellular base station is relatively large, the accuracy of the localization will be relatively low. This may become an issue for future mobile device applications, in particular if these applications involve LBS that need a very accurate location determination. Especially in buildings, the location determination can be improved, e.g. to determine on which floor the mobile device is located.

One way to improve the accuracy of the determined position is to base the location determination on wireless access points, e.g. access points used in a wireless local area network (WLAN). Wireless access points generally have a smaller coverage area than cellular base stations. Furthermore, wireless access points are often located in buildings. Based on determining cell identifiers of wireless access points, Service Set Identifier (SSID) in WLAN, a more precise location determination is possible. A method of determining a location of a mobile device based on wireless access points has been described in U.S. Pat. No. 6,968,194. A wireless access point that is equipped to be used in such a method has for example been described in European patent application 1802154.

Generally, the coverage of a network of wireless access points is not continuous, but concentrated in so called hotspots. As a result, in some geographical areas, the density of wireless access points is relatively low. Consequently, in these areas, a localization of a mobile device based on a method as described in U.S. Pat. No. 6,968,194 may be less accurate than desired.

In a patent application filed in parallel to the present application by the present applicant, it is proposed to determine a location of a mobile device based on available communication units within a predetermined geographical area. The available communication units may support different types of radio technology. Although such an arrangement improves the accuracy of determining a location of a mobile device, a further improvement may be accomplished.

The inventors of the invention described in this application have recognized that the reliability of a communication unit position may vary widely. Some communication units will be installed by consumers, which may not be familiar with all aspects of such an installment. Consequently, erroneous position determination is more likely to occur. On the other hand, the positions of other communication units, especially communication units that are installed by an experienced provider, are generally highly reliable.

Additionally, the inventors have recognized that a communication unit with a large coverage area may, if used in location determination calculations, lead to a less accurate determining of a position as compared to a communication unit with a smaller coverage area. Furthermore, the accuracy of a communication unit position may also depend on the type of coordinates used, e.g. a communication unit position expressed in Global Positioning System (GPS) coordinates may express the position more accurately than a communication unit position expressed in the form of a postal code or a postal address.

Thus, an improvement of localization of a mobile device in a communications network is desired.

SUMMARY

As mentioned above, a further improvement of the reliability of an accurate localization of a mobile device is desired. For this purpose, embodiments of the invention relate to a method of determining a location of a mobile device for use in a first communication network and a second communication network, and in communication with a cellular base station in the second communication network, the method comprising:
 obtaining a list of records of communication units within the first and/or second communication network that are located within a predetermined geographical area, the communication unit records comprising information representative of the identity of the respective communication units, information representative of a position of the respective communication units, and a reliability indication of the respective communication unit;
 detecting communication units within the first and second communication network with the mobile device;
 determining the location of the mobile device based on the information representative of the position, the reliability indication, as well as an accuracy indication of the detected communication units.

In embodiments of the invention, the communication unit record further comprises the accuracy indication. Alternatively, the mobile device may obtain the accuracy indication directly from information provided by the respective communication unit.

The nominal coverage area of a communication unit within the second communication network may be larger than a nominal coverage area of a communication unit within the first communication network. A large coverage area of a communication unit within the second network enables uncomplicated location determination over a large geographical area. A small coverage area of a communication unit within the first network facilitates location determination with high accuracy.

The list may be obtained by receiving the list in response to sending a request for reception of the list to the cellular base station. In this arrangement, the capacity of a broadcast channel of the base station is not burdened unnecessarily. Alternatively, the list may be obtained by reception via a broadcast channel. This arrangement saves time, as the mobile device can obtain the list without a need to send a request and wait for a response.

In embodiments of the invention, the determining comprises:
  determining a reliability order of the detected communication units based on their reliability indication;
  determining an accuracy order of the detected communication units based on their accuracy indication;
  selecting communication units based on the reliability order and the accuracy order in accordance with a selection scheme
  determining the location of the mobile device based on positions of the selected communication units.

The selection scheme may comprise:
  determining, among the detected communication units, whether a position of a detected communication unit with highest accuracy fulfill a predefined condition with respect to a detected communication unit with highest reliability;
  discarding the detected communication unit with highest accuracy if its position does not fulfill the condition;
  repeating the determining and discarding for detected communication units with a next highest accuracy until a certain number of detected communication units has been processed; and
  determining a geographical location of the mobile device based on positions of detected and processed communication units that have not been discarded.

The certain number may equal all detected communication units. Alternatively, the certain number may equal three, which enables the use of triangulation techniques as will be understood by a person skilled in the art.

The predefined condition may be that the distance between the position indicated by the position information of the selected communication unit with highest accuracy and the position indicated by the position information of the selected communication unit with highest reliability is less than a sum of the radius of the coverage area of the two selected communication units. This condition may assist the mobile device to make an estimated guess which communication units are sufficiently accurate and reliable to use in the location determination.

Embodiments of the invention relate to a mobile device arranged to be part of a first communication network and a second communication network, the mobile device comprising:

a receiver for receiving data from one or more communication units in the first communication network and/or the second communication network;
  a memory for storing a list of records of communication units located within a predetermined geographical area;
  a processor for processing data received via the receiver and/or the list stored in the memory;
wherein the mobile device is arranged to perform embodiments of aforementioned method.

Embodiments of the invention relate to a method of managing a list stored in a cellular base station, the list comprising records of communication units located within a predetermined geographical area, the communication unit records comprising information representative of the identity of the respective communication units, information representative of a position of the respective communication units, and a reliability indication of the respective communication units, the method comprising:
  receiving a message from a communication unit, the message comprising the information representative of the identity of the communication unit, and information representative of the position of the communication unit;
  if the information representative of the identity of the communication unit relates to a communication unit for which a record is being present in the list, amending the information representative of the position of the communication unit in the list, if the position information in the list differs from the position information in the message, and; and
  if the information representative of the identity of the communication unit relates to a communication unit not being present in the list, adding a record of a communication unit to the list, including the information representative of the identity of the communication unit, and the information representative of the position of the communication unit.

The method of managing a list enables the cellular base station to provide a list that represents the most recent communication unit distribution within the predetermined geographical area.

In embodiments of the invention, the message further comprises the reliability indication of the communication unit. In such a case, the amending is further performed if the reliability indication in the list differs from the reliability indication in the message for the communication unit, and the adding of a record then includes adding the reliability indication of the communication unit.

In embodiments of the invention, the communication unit records further comprise an accuracy indication. In such a case, the message received from a communication unit further comprises the accuracy indication, the amending further comprises amending the accuracy indication in the list if the accuracy indication in the list differs from the accuracy indication in the message, and the adding of a record includes adding the accuracy indication of the communication unit.

In embodiments of the invention, the communication records further comprise information representative of one or more types of radio technology supported by the respective communication unit. In such a case, the message received from a communication unit further comprises the information representative of the one or more types of radio technology supported by the communication unit, the amending further comprises amending the information representative of the one or more types of radio technology supported by the communication unit in the list differs from the same information received in the message, and the adding of a record includes adding the information representative of the one or more types of radio technology supported by the communication unit. If a mobile device, which receives the list managed by the base station, has a general idea with respect to its position, it may use this information to limit its detection of communication units to one or more types of radio technology used by communication units that are expected to be detectable.

Embodiments of the invention relate to a cellular base station comprising:
- a receiver for receiving data from one or more communication units in a first communication network and/or a second communication network;
- a transmitter for transmitting data towards one or more communication units in the first communication network and/or the second communication network;
- a database for storing data;
- a processor for processing data received via the receiver and/or stored in the memory;

wherein the base station is arranged to perform embodiments of aforementioned method of managing a list.

The receiver of the base station may be arranged to receive a request from a mobile device for providing the list to the mobile device. The base station may then be arranged to provide the list via the transmitter in response to such request. In this embodiment, the capacity of a broadcast channel of the base station is not burdened unnecessarily.

Alternatively, the transmitter of the base station may be arranged to transmit the list via a broadcast channel. Such an embodiment saves time, as the mobile device can obtain the list without a need to send a request and wait for a response.

Finally, embodiments of the invention relate to an access point comprising:
- an access point memory storing information representative of an identity of the access point, information representative of a position of the access point, a reliability indication of the access point;
- a receiver for detecting one or more cellular base stations within a second communication network;
- a processor for enabling transmission of the access point identifier, the information representative of the position of the access point and the information representative of the one or more types of radio technology supported by the access point to the one or more cellular base stations upon detection.

In embodiments of the invention, the access point memory further stores at least one of an accuracy indication of the access point and information representative of one or more types of radio technology supported by the access point.

In embodiments, the access point comprises a position determination unit, e.g. a global positioning system (GPS) receiver, for determining the position of the access point and storing the position in the access point memory. The use of a position determination unit enables the access point to determine its location in a relatively reliable manner.

Further aspects of the invention and embodiments as defined in the claims will be clarified with reference to the attached drawings and corresponding description. It will be understood that the invention is not in anyway restricted to the embodiments disclosed in these drawings.

DETAILED DESCRIPTION

The following is a description of certain embodiments of the invention, given by way of example only.

Throughout this description, the expression "communication unit" has been used to refer to a unit for communication in a communication network. Communication units include, for example, cellular base stations and (wireless) access points.

Additionally, throughout the description, the expression "coverage area" has been used to refer to the geographical area in which signals can be received from a transmitter of a communication unit in a communication network. For clarity reasons, a coverage area of the transmitter has been depicted as a circle. However, it must be understood that the shape of a coverage area as defined above depends on the actual circumstances and may have any other shape. Coverage areas of communication units within a communication network may vary in size, e.g. due to ambient conditions, transmission power settings of the communication unit, etc. For this reason, circles of different radius have been depicted in figures supporting the description.

Throughout this description, the expression "reliability indication" relates to an indication of the reliability of information representative of a position of a communication unit. A geographical location provided by a public cellular operator for one of its cellular base stations will generally be more reliable than a geographical location provided by a private owner of a private WLAN access point. Furthermore, if a communication unit is detected by a number of communication units and/or mobile devices in the neighborhood of a position that is indicated by that communication unit, the likelihood that the detected communication unit is present at its indicated position is high. As a result, the position of that communication unit may be assigned a high reliability.

Throughout the description, the expression "accuracy indication" relates to an indication of the accuracy of data representative of the position of the communication unit. The accuracy indication may be any type of alphanumeric indicator expressing the relative accuracy of the position information. For example, the accuracy indication can be a numerical value for a radius of a circle representing a theoretical coverage area or it may be an integer representing a value range for such a radius. The accuracy indication may comprise two components, a radio technology component and a position component.

The radio technology component relates to an accuracy corresponding to the type of radio technology used by the respective communication unit. This component accounts for the situation that a larger coverage area generally results in less localization accuracy if the position of the respective communication unit is used for localization purposes. For example, a cellular base station used in a Global System for Mobile telecommunications (GSM) system generally has a larger coverage area than an access point used in a Worldwide Interoperability for Microwave Access (WIMAX™) system. The position of the GSM base station is located within its coverage area. The same holds for the position of the WIMAX-access point. The mobile device knows whether it is located within the coverage area of the base station and whether it is located within the coverage area of the WIMAX access point. The larger the coverage area, the less accurate the mobile device can determine its location based on the position of the communication unit providing the coverage area. Because the GSM base station has a larger coverage area, localization based on the position of a GSM base station will generally be less accurate than localization based on the position of a WIMAX-access point. Note that the coverage area of a communication unit may be influenced by transmission settings of the communication unit. A GSM base station with limited power settings such that only a small coverage area is created may have a similar accuracy as a WIMAX-access point with full power settings.

The position component relates to accuracy of communication unit position. This communication unit position accuracy may vary as a result of the type of coordinates used to identify the position. For example, a position expressed in GPS-coordinates is generally more accurate than a position expressed in the format of an area postal code or a postal address.

Both the radio technology component and the position component may be represented by an index number. A low index number may be assigned if the accuracy is low, while a high index number may be assigned if the accuracy is high. It must be understood that it is also possible to assign a low index number to communication units which are positioned with high accuracy and a high index numbers to communication units which are positioned with low accuracy. It may also be possible to assign a single index number to the position accuracy covering both the radio technology component and the position component. Instead of using an index number for the (position component of the) position accuracy, an absolute value of a certain parameter may be used. For example, the position accuracy may represent a distance expressed in meters. In such a case, the number of meters may represent a length of a radius of a circle covering the location of the mobile device with a predetermined likelihood, e.g. 95%.

Figure 1:
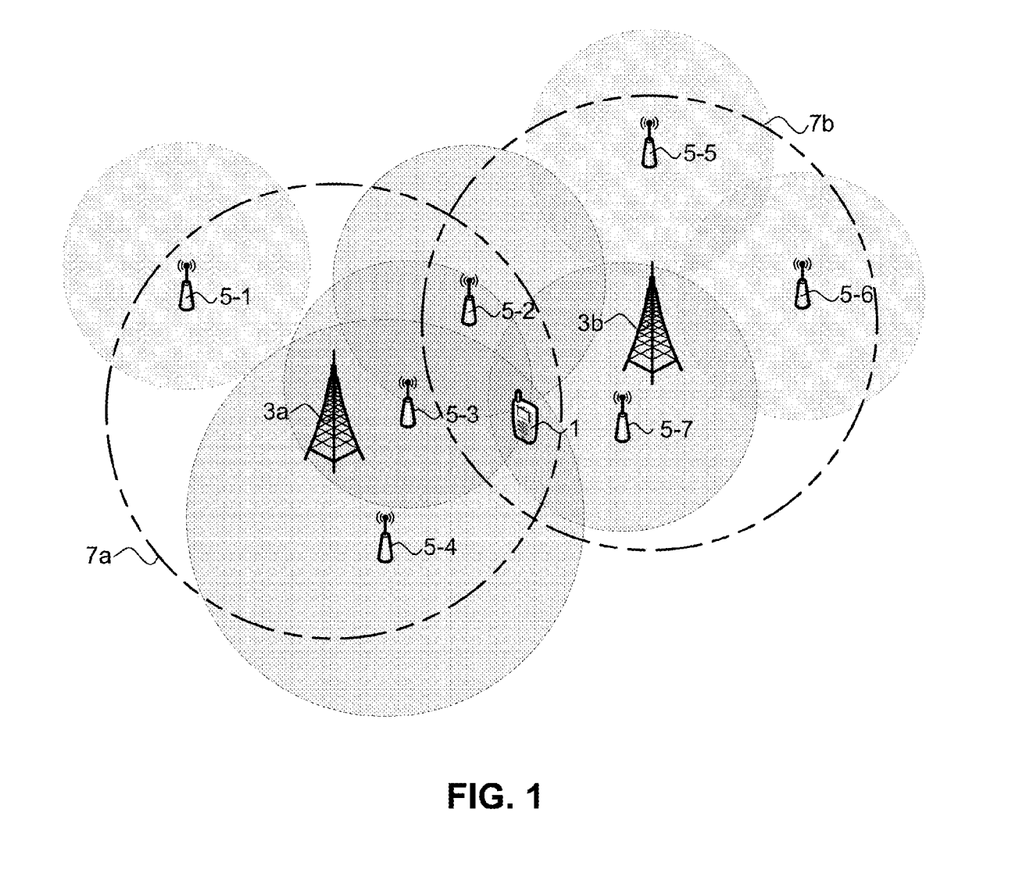
FIG. 1 schematically depicts an exemplary network architecture for implementation of embodiments of the invention.

FIG. 1 schematically depicts an exemplary network architecture in which embodiments of the invention can be implemented. The depicted network architecture comprises a mobile device 1, two cellular base stations 3a, 3b and a number of access points 5-1 to 5-7, e.g. wireless access points. The mobile device 1 is positioned within a coverage area 7a of the cellular base station 3a and within a coverage area 7b of the cellular base station 3b. The mobile device 1 may be camped on either one of the cellular base stations 3a, 3b. The mobile device 1 is further positioned within coverage areas of one or more access points, i.e. in FIG. 1 mobile device 1 is located within the coverage areas of the access points 5-2, 5-3 and 5-7.

The access points 5-1 to 5-7 are part of a first communication network. The cellular base stations 3a, 3b are part of a second communication network. The mobile device 1 is arranged to be in communication with both the first communication network and the second communication network. Hereinafter the first communication network will be referred to as the first network, and the second communication network will be referred to as the second network.

The first network may be a wireless communication network, and may be arranged to support a first type of radio technology. The first type of radio technology may typically comprise a shorter-range wireless communication technology such as Bluetooth™, Radio Frequency Identification (RFID), WLAN, Worldwide Interoperability for Microwave Access (WIMAX™), Near Field Communication (NFC), Ultra Wide Band (UWB), Zigbee™, Digital Enhanced Cordless Telecommunications (DECT), Wibree™, and other suitable technologies. In the example shown in FIG. 1, the access points 5-1 to 5-7 and the mobile device 1 are equipped with interfaces for communication using the first type of radio technology.

The second network may be arranged to support a second type of radio technology. The second type of radio technology may typically comprise a standard cellular radio technology used for mobile phones, such as Global System for Mobile telecommunications (GSM), Universal Mobile Telecommunications System (UMTS), Wideband Code Division Multiple Access (WCDMA), Long Term Evolution (LTE), Interim Standard 95 (IS-95), Code Division Multiple Access 2000 (CDMA2000), WIMAX, Digital Video Broadcasting (DVB), technologies related to a private mobile radio standard like Terrestrial Trunked Radio (TETRA), technologies related to a satellite communication standard provided by a standard body like the International Mobile Satellite Organization (InMarSat) or other suitable technologies. In the example shown in FIG. 1, the base stations 3a, 3b and the mobile device 1 are equipped with interfaces for communication using the second type of radio technology.

It is also possible that the second type of radio technology may be selected from the first list provided above, or that the first type of radio technology may be selected from the second list provided above.

Embodiments of the method of determining a location of a mobile device become more efficient if the nominal coverage area of an access point within the first network is smaller than a nominal coverage area of a base station within the second network. A smaller coverage area of the access point within the first network provides an improved accuracy of position determination. The larger coverage area of the base station with the second network improves the availability of the position determination with improved accuracy.

Embodiments of the invention will be explained with reference to the exemplary network architecture of FIG. 1.

Figure 2:
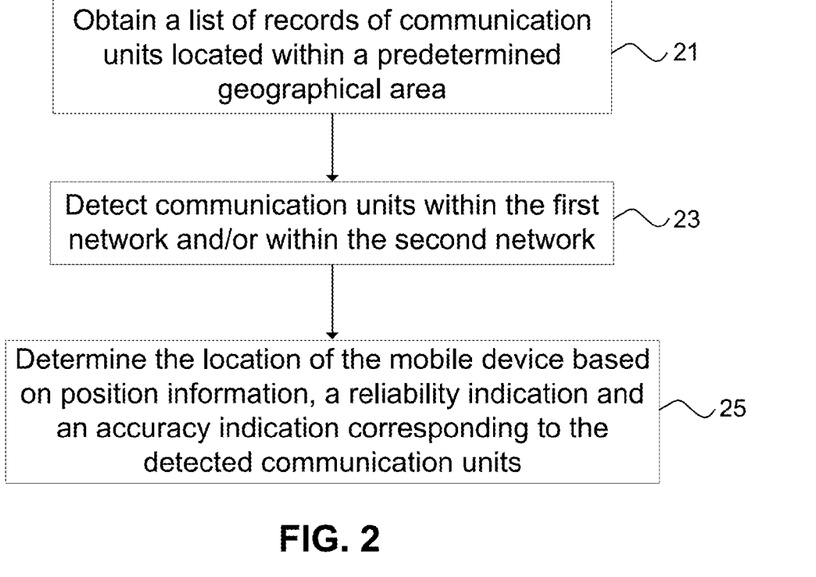
FIG. 2 schematically depicts a flow diagram of a method of determining a location of a mobile device according to an embodiment of the invention.

FIG. 2 schematically depicts a flow diagram of a method of determining a location of a mobile device according to an embodiment of the invention.

In action 21, the mobile device 1 obtains a list of records of communication units located within a predetermined geographical area. The predetermined geographical area can relate to a nationwide, regional or local area, including a postal area. The predetermined geographical area may also correspond to a coverage area of one or more base stations and/or access points. A communication unit record comprises information representative of the identity of the respective communication unit, hereinafter referred to as a communication unit identifier, information representative of a position of the respective communication unit, hereinafter referred to as position information, and a reliability indication of the respective communication unit. The communication unit record may further comprise an accuracy indication of the respective communication unit. Alternatively or additionally, the communication unit record may further comprise information representative of the one or more types of radio technology that are supported by the communication unit.

The communication unit identifier may take the form of a Media Access Control (MAC) address, an SSID, or other suitable code for identifying the communication unit. The list of cell records may be stored in the mobile device 1.

The position information of the communication unit may be in any format known to a person skilled in the art. For example, such position information may take the form of x- and y-coordinates (optionally also a z-coordinate), longitude-latitude coordinates (optionally an altitude coordinate as well) or relate a certain type of coding, e.g. a postal code or a postal address.

The list may be obtained from the base station the mobile device 1 is camped on, i.e. base station 3a or 3b in the example of FIG. 1. The list may be stored in these base stations or may be stored in a data storage mode of the network and forwarded to the base stations as needed, e.g. via a fixed network like Internet or a Public Switched Telephone Network (PSTN).

In action 23, the mobile device 1 detects communication units within the first network and communication units within the second network. The mobile device 1 may detect the communication units by scanning for signals transmitted by the communication units. In an embodiment, the detecting comprises determining an identity of a detected communication unit. The identity may be determined based on information provided by a communication unit via a broadcast channel. Alternatively, such information may be provided by the communication unit via a communication interface in response to a signal sent by the mobile device 1. In an embodiment, the detecting comprises determining a position of a detected communication unit. This can be done to verify a position mentioned in the list. The position of the detected communication unit may be based on information provided by the communication unit via a broadcast channel or via a communication interface in response to a signal sent by the mobile device 1. In a similar way, the communication unit may provide information to the mobile device 1 regarding its accuracy and/or reliability.

If a mobile device 1 has a general idea with respect to its position, e.g. if it can make an estimate as a result of an earlier determination of its location, and communication records in the list comprise information representative of the type(s) of radio technology used by the mobile device 1, the mobile device 1 may use the list to limit its detection to one or more types of radio technology used by communication units that are expected to be detectable.

Finally, in action 25, a location of the mobile device 1 is calculated based on the position information, and the reliability indication corresponding to the communication units detected in action 23. In embodiments, the mobile device further uses information representative of the accuracy of the respective communication units, e.g. by recognizing the type of radio technology supported by the communication unit and/or recognizing the type of coordinates used to express the position information. In embodiments, the calculation performed in action 25 includes an accuracy indication as described earlier.

It should be noted that it is not important whether obtaining the list in action 21 occurs prior to the detecting in action 23 or afterwards. Both the obtaining of the list and the detecting of the communication units need to have been performed before proceeding to the determining of the location in action 25. For example, the mobile device 1 may be prompted to obtain the list if it detects a base station or access point that is not on the list presently known.

The method of FIG. 2 will now be discussed with reference to the exemplary network architecture depicted in FIG. 1. In this example, the predetermined geographical area is taken to correspond to an area covered by at least one of the coverage areas 7a, 7b.

In this situation, the list, which includes communication unit records with respect to communication units being part of at least one of the first and second network, may include records for base stations 3a, 3b and records for access points 5-1 through 5-7.

In the exemplary network architecture of FIG. 1, the mobile device 1 may detect base stations 3a and 3b, and access points 5-2, 5-3 and 5-7. The determining of the position may then be based on a calculation taking into account the position information, reliability indication and, optionally, accuracy indication of base stations 3a, 3b and access points 5-2, 5-3 and 5-7. More details with respect to such calculation will be discussed with reference to FIGS. 3 and 4.

If more than one base station covers the predetermined geographical area, e.g. like base stations 3a, 3b in FIG. 1, it is not essential that all base stations manage the list. One base station within a cluster of base stations may be assigned to manage the list such that it remains up-to-date, and to forward the list to other base stations, preferably via the second network. The other base stations may then store a copy of the list. Alternatively, the list may be stored in a data storage mode of the second network, and forwarded as needed. Hereinafter, a base station storing the list is referred to as a master base station.

Thus, the master base station may be a base station with which the mobile device 1 has established an active communication link, e.g. base station 3a or 3b in FIG. 1. In this case, a direct communication link is established between the master base station and the mobile device. For example, in FIG. 1 base stations 3a and 3b may serve as a master base station for the aforementioned purpose. Alternatively, a base station without a direct communication link with the mobile device 1 may serve as the master base station. For example, if the mobile device 1 in FIG. 1 has an active communication link with base station 3a, base station 3b could still be the master base station, and vice versa. In that case, the mobile device 1 may receive a copy of the list from the base station that it is camped on.

The reliability indication and/or accuracy indication may be assigned to the communication unit records by a provider or by a trustworthy user, e.g. within the master base station that stores the list. Alternatively, such indications may be added in a different way. For example, an accuracy indication may be stored in the memory of the communication unit upon manufacturing, where the accuracy indication relates to the radio technology the communication unit can handle. Thus, such a measure mainly relates to the radio technology component of the accuracy indication as explained earlier. It may also be possible that the communication unit is capable of determining its own radio technology accuracy component based on one or more its parameters like antenna gain, radio technology used, and power settings. Furthermore, if the communication unit is provided with a GPS-receiver, this could be reflected in an indication within the memory of the communication unit related to the position component of the accuracy indication. It may also be possible that the communication unit is capable of determining the position component of the accuracy indication based on its own measurements, e.g. by using a position determination unit as discussed with reference to FIG. 9. A spread of position measurements performed with the position determination unit may then be a measure of the accuracy of the position determination.

The method described with reference to FIG. 2 enables a localization of a mobile device with high accuracy and reliability that is widely applicable. The calculation of the location is based on reliable data of the most relevant available communication units for calculation.

The obtaining in action 21 may comprise a sending of a request for reception of the list to a base station. In response to this request, the list is received by the mobile device. The request may be sent to any base station within the predetermined geographical area, including the master base station which may store the list. If the request is sent to a base station not being the master base station, the base station may be arranged to send a copy of the list. if the request is sent to a base station that does not have a copy of the list available, the base station may arrange a copy of the list in response to the request sent by the mobile device 1, and forward the list to the mobile device upon reception.

Alternatively, the obtaining in action 21 may include receiving the list via a broadcast channel. In this case, all or some of the base stations may be arranged to broadcast the list via such a broadcast channel.

Figure 3:
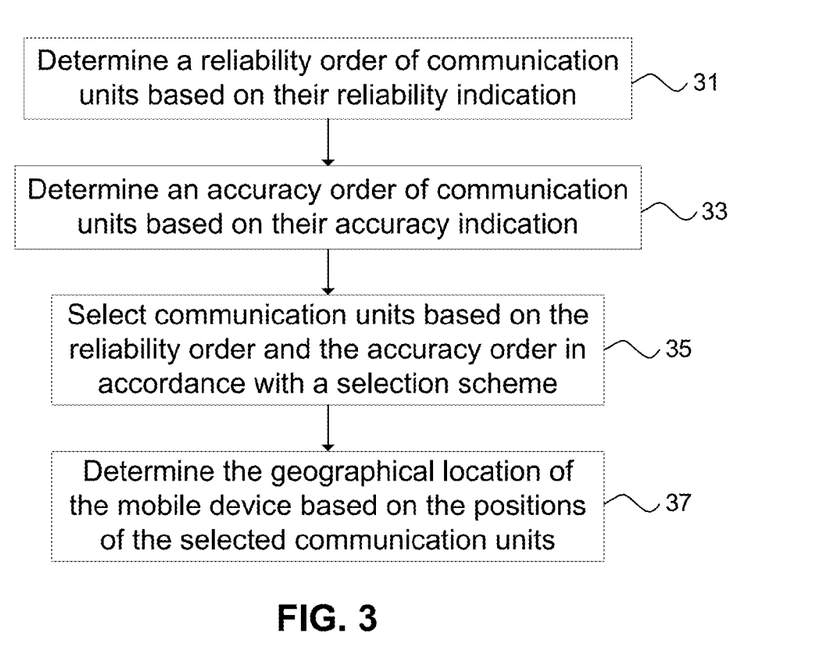
FIG. 3 schematically depicts a flow diagram of an embodiment of a method of calculating the location of a mobile device.

FIG. 3 schematically depicts a flow diagram of an embodiment of the determining of the location of a mobile device defined as action 25 in FIG. 2.

In action 31, a reliability order of communication units is determined. The reliability order is based on the reliability indication of the communication units detected during the scanning in action 23 described with reference to FIG. 2. The reliability order can be an order where the most reliable communication unit is positioned first, followed by the next most reliable communication unit, etc., i.e. an order from high to low reliability. Alternatively, the order may be reversed, i.e. the least reliable communication unit first, followed by the next least reliable communication unit, etc.

In action 33, an accuracy order of communication units is determined. The accuracy order is based on the accuracy indication of the communication units detected during the scanning. The accuracy indication may be obtained from the record in the list regarding the respective communication unit or may be determined by the mobile device, e.g. based on the position information of the respective communication unit and/or radio technology supported by the respective communication unit. The accuracy order can be an order where the most accurate communication unit is positioned first, followed by the next most accurate communication unit, etc., an order from high to low accuracy. Alternatively, the order may be an order from low to high accuracy, i.e. the least accurate communication unit first, followed by the next least accurate communication unit, etc. The accuracy order may take account of the different components therein, i.e. the radio technology component and the position component. For example, if an order is chosen from high to low accuracy, and there are two communication units with the highest accuracy with respect to the radio technology component, the communication unit with the most accurate position component may come first, followed by the communication unit with the less accurate position component.

It should be noted that although the action of determining the accuracy order has been discussed as being subsequent to the action of determining the reliability order, these actions may also be performed in a different order, e.g. opposite or in parallel, as will be understood by a person skilled in the art.

In action 35, communication units are selected out of the communication units detected during the scanning. The selection is based on the reliability order and the accuracy order as determined in actions 31 and 33 respectively. The selection can be made in accordance with a selection scheme. Preferably, at least three communication units are selected to determine the location of the mobile device, because this enables the use of triangulation techniques as will be understood by a person skilled in the art.

Figure 4:
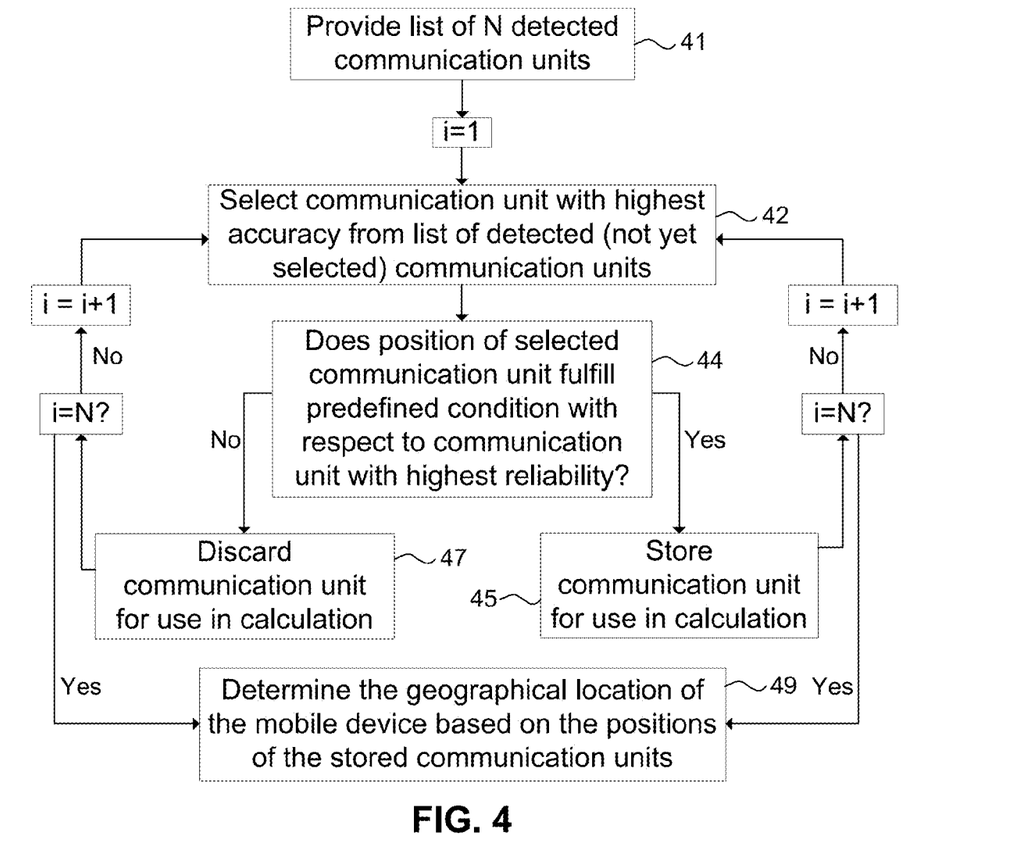
FIG. 4 schematically depicts a flow diagram of a selection scheme according to an embodiment of the invention.
Figure 5:
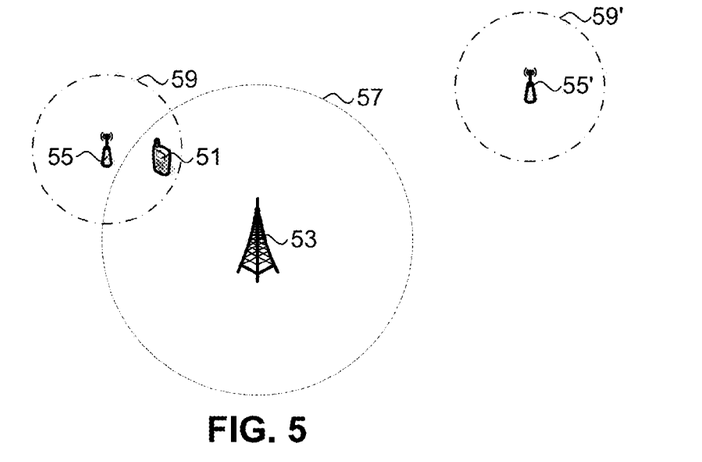
FIG. 5 schematically depicts an exemplary network architecture visualizing an aspect of the selection scheme of FIG. 4.

FIGS. 4, 5 illustrate an embodiment of a selection scheme, e.g. a selection scheme that can be used in the method of calculating the location of a mobile device. FIG. 4 schematically depicts a flow diagram of the selection scheme, while FIG. 5 schematically depicts an exemplary network architecture visualizing an aspect of the selection scheme of FIG. 4.

First, in action 41, a list of N detected communication units is provided, N being the number of detected communication units by the mobile device. Subsequently, in action 42, the communication unit with the highest accuracy, which may be indicated by an accuracy indication, is selected from the list of detected communication units.

Subsequently, in action 44, it is checked whether the position of the selected communication unit fulfills a predefined condition with respect to the communication unit with the highest reliability, which may be indicated by a reliability indication. The predefined condition may be that the distance between the position indicated by the position information of the selected communication unit and the position indicated by the position information of the communication unit with the highest reliability is less than the sum of the radius of the theoretical coverage of the two communication units. In this manner, the mobile device makes an estimated guess which communication units are sufficiently accurate and reliable to use in the location determination. The use of the most reliable communication unit enables an elimination of major position errors due to small mistakes, e.g. small typographic errors or "old" position information. For example, swapping two numbers in position information defining the location of a communication may result in a reported position located in an entirely different country. Additionally, if a user of an access point forgets to change the position information after a move towards a new home, the position information will be highly unreliable. If the position of the selected communication unit does fulfill the predefined condition with respect to the communication unit with highest reliability, the selected communication unit is stored, e.g. in the mobile device. The action of storing is schematically shown in FIG. 4 as action 45. On the other hand, if the position of the selected communication unit does not fulfill the predefined condition with respect to the communication unit with highest reliability, the communication unit is discarded for further use for calculation purposes, schematically depicted in FIG. 4 by action 47.

Now, actions 42, 44, 45 or 47 may be repeated, until all N communication unit have been considered. In FIG. 4, this process is schematically shown by an index counter i. Each time a communication unit has been considered, the index counter is compared with the total numbers of communication units to be considered, i.e. N. If index counter i is not equal to N, the index counter is raised by one and actions 42, 44, 45 or 47 are repeated. If index counter i equals the total number of communication units to be considered N, the method proceeds to action 49. Alternatively, the method may proceed to action 49 if a predefined number of communication units, e.g. three, has been stored in action 45. In action 49, the geographical location of the mobile device is determined employing positions of the stored communication units. If at least three communication units have been stored, calculation techniques like triangulation may be used, which enables an accurate localization of the mobile device.

In embodiments of the invention, after performing the actions described with reference to actions 42, 44, 45, and 47, but before proceeding to the determining of the geographical location of the mobile device in action 49, a further selection of communication units may be made based on secondary criteria, e.g. whether or not a distance between positions of communication units stored in action 45 exceed a certain threshold value.

FIG. 5 schematically depicts an exemplary network architecture comprising a mobile device 51, a base station 53 and an access point 55. The coverage area 57 of the base station 53 is larger than the coverage area 59 of the access point 55. The base station 53 has been installed by an experienced telecommunications services provider, while the access point 55 has been installed by an untrained consumer. Consequently, the most reliable communication unit is the base station 53, while the most accurate communication unit is the access point 55.

In the exemplary network architecture of FIG. 5, the position of the access point 55 has been registered wrongly, schematically shown by access point 55' with coverage area 59'. The distance between the reported position of the most accurate communication unit, i.e. access point 55', and the position of the communication unit with the highest reliability, i.e. base station 53 is more than the sum of the radius of the theoretical coverage areas of the two communication units, i.e. coverage areas 57 and 59' respectively. The mobile device 51 can detect the access point 55, but it does not know its actual position. Following the scheme of FIG. 4, the position information with respect to the access point 55 is identified as erroneous, because its reported position does not fulfill the predefined condition. Thus, according to the scheme of FIG. 4, the access point 55 will be discarded from further use in calculations of the location of the mobile device 51. As a result, in this example, the determining of the location of the mobile device 51 will solely be based on the position of base station 53.

It can be readily understood that the method of determining a location of a mobile device as described with reference to FIGS. 1-5, benefits from a list that is reliable and up to date. That is, the list should represent the position, the reliability indication and, optionally, the accuracy indication of all communication units within the predetermined geographical area at the moment of obtaining as well as possible, and should include recent changes.

Generally, within the predetermined geographical area, the number and locations of communication units varies. For example, new communication units may be activated or existing communication units may be deactivated, communication units may change location within the predetermined geographical area, or communication units may be moved inside or outside the predetermined geographical area. Therefore, it is desirable to manage the list so as to be able to provide a list that represents the most recent communication unit distribution within the predetermined geographical area.

Figure 6:
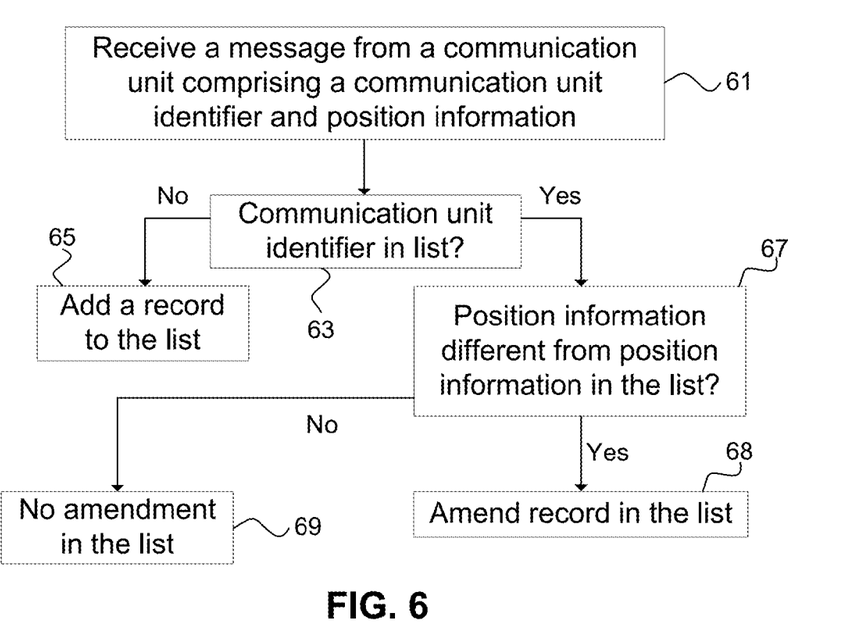
FIG. 6 schematically depicts a flow diagram of a method of managing a list according to an embodiment of the invention.

FIG. 6 schematically depicts a flow diagram of a method of managing a list for use in a base station, the list comprising records of communication units located within a predetermined geographical area. The base station may take the form of the master cellular base station 80 discussed with reference to FIG. 8.

In action 61, the base station receives a message from a communication unit. The message comprises at least a communication unit identifier, and position information of the respective communication unit. The message may further comprise a reliability indication of the respective communication unit and/or an accuracy indication of the respective communication unit. Alternatively, the base station may receive the reliability indication of the respective communication unit in a different way, e.g. via a provider of the respective communication unit. The message may further comprise information representative of the one or more types of radio technology that are supported by the respective communication unit. The master base station is part of the second network, but may receive messages regarding the identity, position, reliability and accuracy from access points within the first network and base stations within the second network. In order to be able to receive a message from an access point within the first network, the base station may be part of the first network as well. Alternatively and/or additionally, the access point may send the message via a fixed network like Internet or PSTN.

In action 63, the base station checks whether the communication unit identifier is present in the list.

If the identifier is not present in the list, a communication unit record including the communication unit identifier, and the position information of the respective communication unit is added to the list. If available in the message, a reliability indication of the respective communication unit, an accuracy indication of the respective communication unit and/or information on the radio technology of the communication unit is added to the list in action 65. On the other hand, if the communication unit identifier is present in the list, the method proceeds to action 67, in which the position information in the message is compared with the position information stored in the list for the respective communication unit. If present in the message, the reliability indication, accuracy indication and/or radio technology are compared in a similar way.

If the position information, or, if present in the message, the reliability indication, the accuracy indication and/or radio technology, in the message is different from the similar type of data for the respective communication unit stored in the list, the base station amends the respective information in the list in action 68. On the other hand, if the data in the message is entirely the same as the data stored in the list for the respective communication unit, no amendment is made, schematically represented in FIG. 6 as action 69. It should be understood that "no amendment" includes a replacement of all data in a record, where the new data being stored is similar to the data being replaced. In such a case a timestamp may be updated. In embodiments of the invention, amendments are only made conditionally, e.g. only if the information provided in the message is considered to have a minimum reliability.

Figure 7:
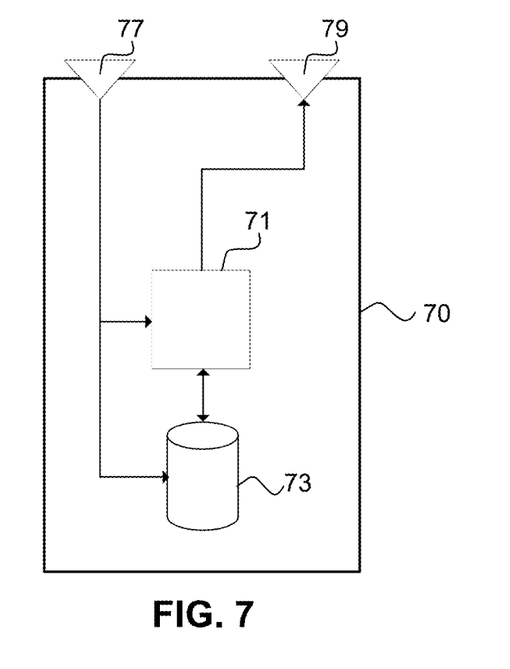
FIG. 7 schematically depicts a mobile device that may be used in embodiments of the invention.

FIG. 7 schematically depicts an embodiment of a mobile device 70 according to an embodiment of the invention. The mobile device 70 is arranged to perform embodiments of a method of determining a location of a mobile device in the first network, e.g. the method schematically depicted in and described with reference to FIGS. 2-4.

The mobile device 70 comprises a processor 71, a memory 73, and a receiver 77. The processor 71 is communicatively coupled to the memory 73. The processor 71 may comprise a control unit to control signals received by the receiver 77, e.g. for the purpose of controlling detection.

The receiver 77 may be arranged to operate within the first network and the second network. Alternatively, the mobile device 70 may comprise two receivers, a first receiver arranged to operate within the first network, and a second receiver arranged to operate within the second network.

In embodiments of the invention, the mobile device 70 further comprises a transmitter 79. In such embodiment, the processor 71 may be arranged to control signals to be sent via the transmitter 79.

Figure 8:
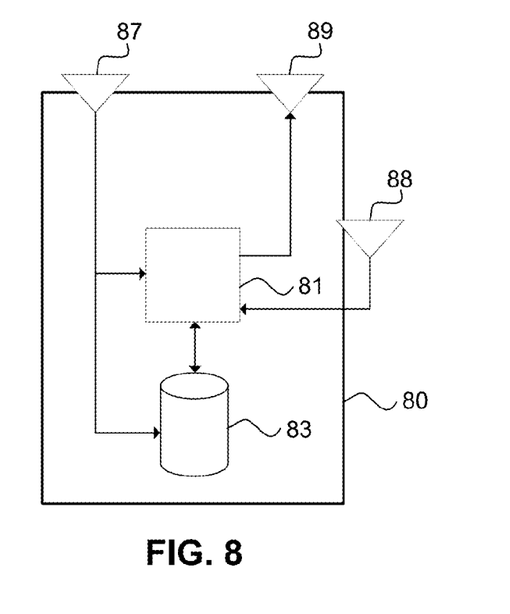
FIG. 8 schematically depicts an embodiment of a cellular base station that may be used in the embodiments of the invention.

FIG. 8 schematically depicts an embodiment of a master base station 80 that may be used in embodiments of the invention, i.e. as base station 3a, 3b in FIG. 1 or base station 53 in FIGS. 5A, 5B. The base station 80 may further be used to implement a method of managing a list of records of communication units located within a predetermined geographical area. An embodiment of such a method has been discussed with reference to FIG. 6.

The base station 80 comprises a processor 81 communicatively coupled to a database 83. In the database 83, a list of records of communication units may be stored, the communication units being located within a predetermined geographical area. A communication unit record comprises a communication unit identifier, position information of a communication unit, a reliability indication of a communication unit and an accuracy indication of a communication unit. The communication unit record may further comprise information representative of the one or more types of radio technology that are being supported by the communication unit.

The base station 80 further comprises a receiver 87 and a transmitter 89. The receiver 87 and the transmitter 89 are arranged to communicate via a communication interface within the second network, and may be able to communicate via a communication interface within the first network as well. In embodiments, the cellular base station 80 may further comprise a further receiver 88. The further receiver 88 may be connected to a fixed network, e.g. Internet or a PSTN.

Figure 9:
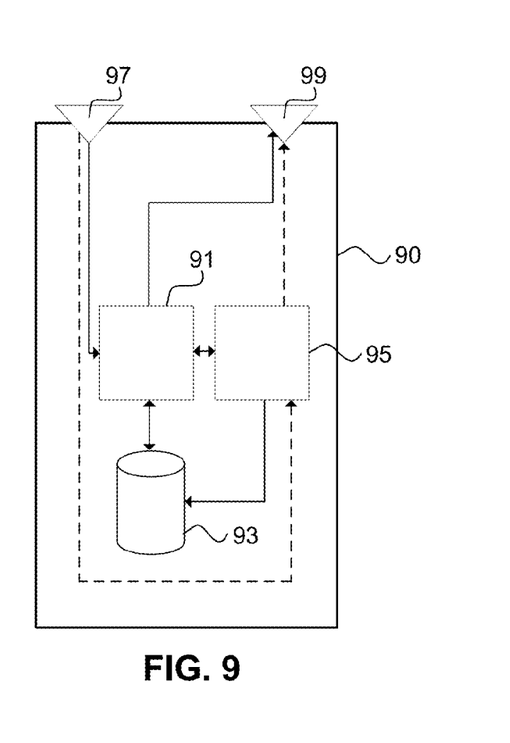
FIG. 9 schematically depicts an embodiment of an access point that may be used in embodiments of the invention.

FIG. 9 schematically depicts an embodiment of an access point 90 that may be used in embodiments of the present invention. The access point 90 comprises a processor 91, a memory 93, a receiver 97 and a transmitter 99.

The receiver 97 may be arranged to receive signals from a mobile device. The receiver 97 may further be arranged to detect one or more base stations within the second network.

The transmitter 99 may be arranged to transmit an access point identifier, and position information of the access point to one more detected base stations. In embodiments, the transmitter 99 may further transmit at least one of a reliability indication of the access point, an accuracy indication of the access point and information representative of one or more types of radio technology supported by the access point to the one or more detected base stations. If the respective base station is part of the first network and located within the coverage area of the access point 90, the information may be sent via a communication interface within the first network. Alternatively, the access point 90 may be part of the second network, and the transmitter 99 may be arranged to transmit the information via a communication interface within the second network.

The processor 91 may comprise a control unit to control signals received by the receiver 97 and signals to be sent via the transmitter 99, e.g. for the purpose of controlling detection of base stations and/or for the purpose of responding to signals received from a mobile device. Alternatively, or additionally, the processor 91 may enable transmission of the access point identifier, the position information of the access point, the reliability indication of the access point and the accuracy indication of the access point in a different way, e.g. by transmission via a fixed network like Internet or a PSTN.

The access point memory 93 is configured to store or stores an access point identifier, position information, a reliability indication and an accuracy indication of the access point 90. The access point identifier may already have been stored in the access point memory 93 at the time of manufacturing. The position information of the access point 90, as well as the reliability indication and/or the accuracy indication, may be provided via a user interface (not shown), e.g. via a keyboard, touch screen, etc.

In an embodiment, the access point 90 further comprises a position determination unit 95 for determining the position of the access point 90. The position determination unit 95 may make use of the receiver 97 and the transmitter 99 of the access point 90. If the position has been determined, the position may be stored in the access point memory 93. The location determination unit 95 may comprise a global positioning system (GPS) receiver.

In FIG. 9, data transferred in view of the determining of a position by means of a position determination unit has been shown with the dashed arrows. Data related to the detecting action, has been depicted by means of the solid arrows.

It must be understood that although embodiments of the invention have been described with reference to two different types of radio technology, the invention is not limited to this number. Thus, in embodiments of the invention more than two different radio technologies may be applied.

The invention has been described by reference to certain embodiments discussed above. It will be recognized that these embodiments are susceptible to various modifications and alternative forms well known to those of skill in the art.

ABBREVIATIONS

CDMA2000 Code Division Multiple Access 2000
DECT Digital Enhanced Cordless Telecommunications
DVB Digital Video Broadcasting
GSM Global System for Mobile telecommunications
InMarSat International Mobile Satellite Organization
IS-95 Interim Standard 95
LBS Location Based Services
LTE Long Term Evolution
MAC Media Access Control
NFC Near Field Communication
RFID Radio Frequency Identification
SSID Service Set Identifier
TETRA Terrestrial Trunked Radio
UMTS Universal Mobile Telecommunications System
UWB Ultra Wide Band
WCDMA Wideband Code Division Multiple Access
WIMAX Worldwide Interoperability for Microwave Access
WLAN Wireless Local Area Network

The invention claimed is:

1. A method of determining a location of a mobile device for use in a first communication network and a second communication network, and in communication with a cellular base station in the second communication network, the method comprising:

the mobile device obtaining a list of records of communication units within the first or second communication network that are located within a predetermined geographical area, the communication unit records comprising information representative of the identity of each respective communication units, information representative of a position of each respective communication units, and a reliability indication of each respective communication unit;

the mobile device detecting communication units within the first or second communication network; and the mobile device determining the location of the mobile device based on the information representative of the position of selected detected communication units, wherein such selection is based on the information representative of the position, the reliability indication, and an accuracy indication of the detected communication units, wherein the selection is further based on a distance between positions of the detected communication units indicated by the information representative of the position of respective communication units.

2. The method of claim 1, wherein the communication unit record provides the mobile device with said accuracy indication.

3. The method of claim 1, wherein the mobile device obtains said accuracy indication directly from information provided by each respective communication unit.

4. The method of claim 1, wherein a nominal coverage area of a communication unit within the second communication network is larger than a nominal coverage area of a communication unit within the first communication network.

5. The method of claim 1, wherein said obtaining comprises:
the mobile device sending a request for reception of said list to a cellular base station; and
the mobile device receiving said list in response.

6. The method of claim 1, wherein said obtaining comprises receiving said list via a broadcast transmission.

7. The method of claim 1, wherein said determining comprises:
the mobile device determining a reliability order of the detected communication units based on their reliability indication;
the mobile device determining an accuracy order of the detected communication units based on their accuracy indication;
the mobile device selecting a subset of communication units based on the reliability order and the accuracy order in accordance with a selection scheme, and
the mobile device determining the location of the mobile device based on positions of the selected subset of communication units.

8. The method of claim 7, wherein said selection scheme comprises:
the mobile device determining, among the detected communication units, whether a position of a detected communication unit with a highest accuracy fulfills a predefined condition with respect to a detected communication unit with a highest reliability;
the mobile device discarding the detected communication unit with highest accuracy if its position does not fulfill the condition;
the mobile device repeating said determining and discarding for respective detected communication units with a next highest accuracy until a pre-determined number of detected communication units has been processed; and
the mobile device determining a geographical location of the mobile device based on positions of detected and processed communication units that have not been discarded.

9. The method of claim 8, wherein the pre-determined number equals all detected communication units.

10. The method of claim 8, wherein the predefined condition is that the distance between the position indicated by the position information of the selected communication unit with highest accuracy and the position indicated by the position information of the selected communication unit with highest reliability is less than a sum of the radius of the coverage area of the two selected communication units.

11. A mobile device arranged to be part of a first communication network and a second communication network, the mobile device comprising:
a receiver for receiving data from one or more communication units in the first communication network or the second communication network;
a memory for storing a list of records of communication units located within a predetermined geographical area; and
a processor for processing data received via said receiver and processing the list stored in said memory and further configured to:
obtain the list of records of communication units within the first or second communication network that are located within a predetermined geographical area, the communication unit records comprising information representative of the identity of each respective communication units, information representative of a position of each respective communication units, and a reliability indication of each respective communication unit;
detect communication units within the first and second communication network; and
determine the location of the mobile device based on the information representative of the position of selected detected communication units, wherein such selection is based on the information representative of the position, the reliability indication, and an accuracy indication of the detected communication units, wherein the selection is further based on a distance between positions of the detected communication units indicated by the information representative of the position of respective communication units.

12. The mobile device of claim 11, wherein the communication unit record provides the mobile device with said accuracy indication.

13. The mobile device of claim 11, wherein the mobile device obtains said accuracy indication directly from information provided by each respective communication unit.

14. The mobile device of claim 11, wherein a nominal coverage area of a communication unit within the second communication network is larger than a nominal coverage area of a communication unit within the first communication network.

15. The mobile device of claim 11, wherein the processor is further configured to:
send a request for reception of said list to a cellular base station; and
receive said list in response.

16. The mobile device of claim 11, wherein the processor is further configured to receive said list via a broadcast transmission.

17. The mobile device of claim 11, wherein the processor is further configured to:
determine a reliability order of the detected communication units based on their reliability indication;
determine an accuracy order of the detected communication units based on their accuracy indication;
select a subset of communication units based on the reliability order and the accuracy order in accordance with a selection scheme, and
determine the location of the mobile device based on positions of the selected subset of communication units.

18. The mobile device of claim 17, wherein the processor is further configured to:
determine, among the detected communication units, whether a position of a detected communication unit with a highest accuracy fulfills a predefined condition with respect to a detected communication unit with a highest reliability;
discard the detected communication unit with highest accuracy if its position does not fulfill the condition;

repeat the determining and discarding for respective detected communication units with a next highest accuracy until a pre-determined number of detected communication units has been processed; and determine a geographical location of the mobile device based on positions of detected and processed communication units that have not been discarded.

19. The mobile device of claim 18, wherein the pre-determined number equals all detected communication units.

20. The mobile device of claim 18, wherein the predefined condition is that the distance between the position indicated by the position information of the selected communication unit with highest accuracy and the position indicated by the position information of the selected communication unit with highest reliability is less than a sum of the radius of the coverage area of the two selected communication units.

* * * * *